United States Patent [19]

Deb

[11] 4,324,622
[45] Apr. 13, 1982

[54] MULTILAYERED ELECTROPLATOGRAPHIC ELEMENT COMPRISING ION CONDUCTIVE AND ELECTROCHROMIC LAYERS

[75] Inventor: Satyendra K. Deb, Stamford, Conn.

[73] Assignee: American Cyanamid Company, Stamford, Conn.

[21] Appl. No.: 774,728

[22] Filed: Mar. 7, 1977

Related U.S. Application Data

[62] Division of Ser. No. 509,578, Sep. 26, 1974, abandoned.

[51] Int. Cl.² ............................................. G03G 5/00
[52] U.S. Cl. .......................................... 430/63; 204/2;
        430/64; 430/65; 204/18.1; 430/66
[58] Field of Search .......................... 96/1.5, 1 E, 1 R;
        204/2, 18 PC

[56] References Cited

U.S. PATENT DOCUMENTS

| | | | |
|---|---|---|---|
| 2,319,765 | 5/1943 | Talmey | 204/2 |
| 2,764,693 | 9/1956 | Jacobs et al. | 96/1 E X |
| 3,010,883 | 11/1961 | Johnson et al. | 204/18 PC |
| 3,082,085 | 3/1963 | Miller et al. | 96/1 E |
| 3,085,051 | 4/1963 | Hamm et al. | 204/18 PC |
| 3,087,869 | 4/1963 | Hamm et al. | 204/2 |
| 3,106,156 | 10/1963 | Reithel | 96/1 E X |
| 3,138,547 | 6/1964 | Clark | 204/2 |
| 3,213,003 | 10/1965 | Johnson et al. | 204/18 PC |
| 3,232,852 | 2/1966 | Urbach et al. | 204/18 PC |
| 3,309,198 | 3/1967 | Robillard | 96/1 E |
| 3,439,174 | 4/1969 | Snaper | 204/2 X |
| 3,455,683 | 7/1969 | Letter | 96/1 E |
| 3,556,787 | 1/1971 | Letter | 96/1.8 |
| 3,565,613 | 2/1971 | Tamai et al. | 96/1 E |
| 3,707,372 | 12/1972 | Hallman et al. | 96/1.5 X |

FOREIGN PATENT DOCUMENTS 464112  4/1937  United Kingdom ................. 96/1 E

OTHER PUBLICATIONS

Yates, "Photography with Electricity", *Television*, vol. 1 No. 1, Jun. 1928, p. 20.
Robillard (2), "New Approaches in Photography", *Photographic Science and Engineering*, vol. 8, No. 1, Jan.–Feb. 1964, pp. 18–34.

*Primary Examiner*—John D. Welsh
*Attorney, Agent, or Firm*—Charles J. Fickey; Gordon L. Hart

[57] ABSTRACT

Electrophotographic element typically comprising in sandwiched arrangement a transition metal oxide layer and a photoconductive layer. When an electric field is applied across the element, preferably after inserting the element between a pair of electrode layers, and an optical image is projected onto the photoconductive layer, the resulting conductivity pattern in the photoconductive layer causes corresponding coloration in the transition metal oxide layer, thereby visibly recording the optical image.

7 Claims, 5 Drawing Figures

U.S. Patent  Apr. 13, 1982  Sheet 1 of 2  4,324,622
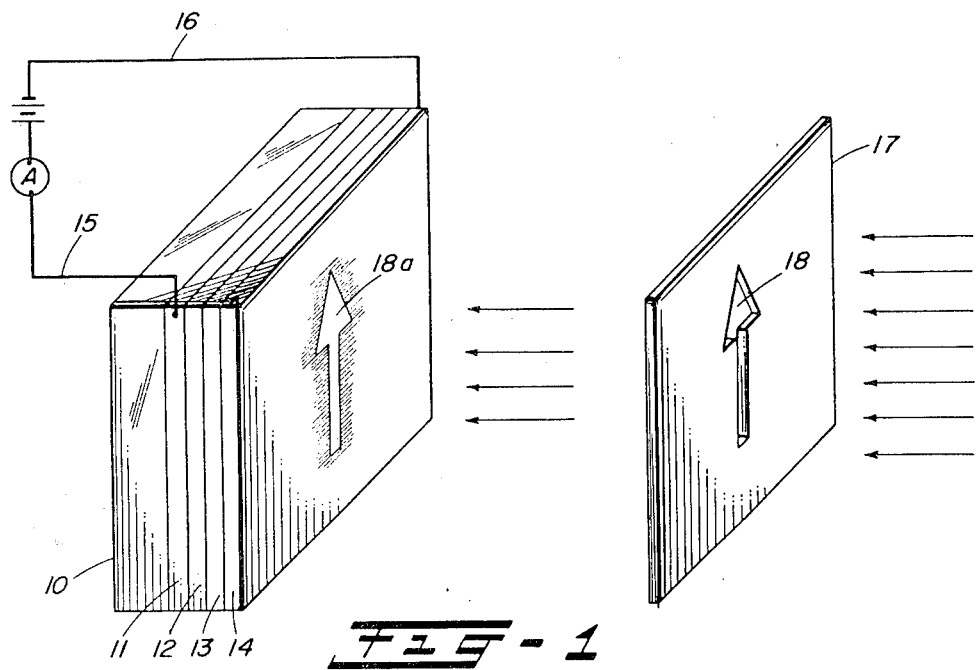
FIG-1
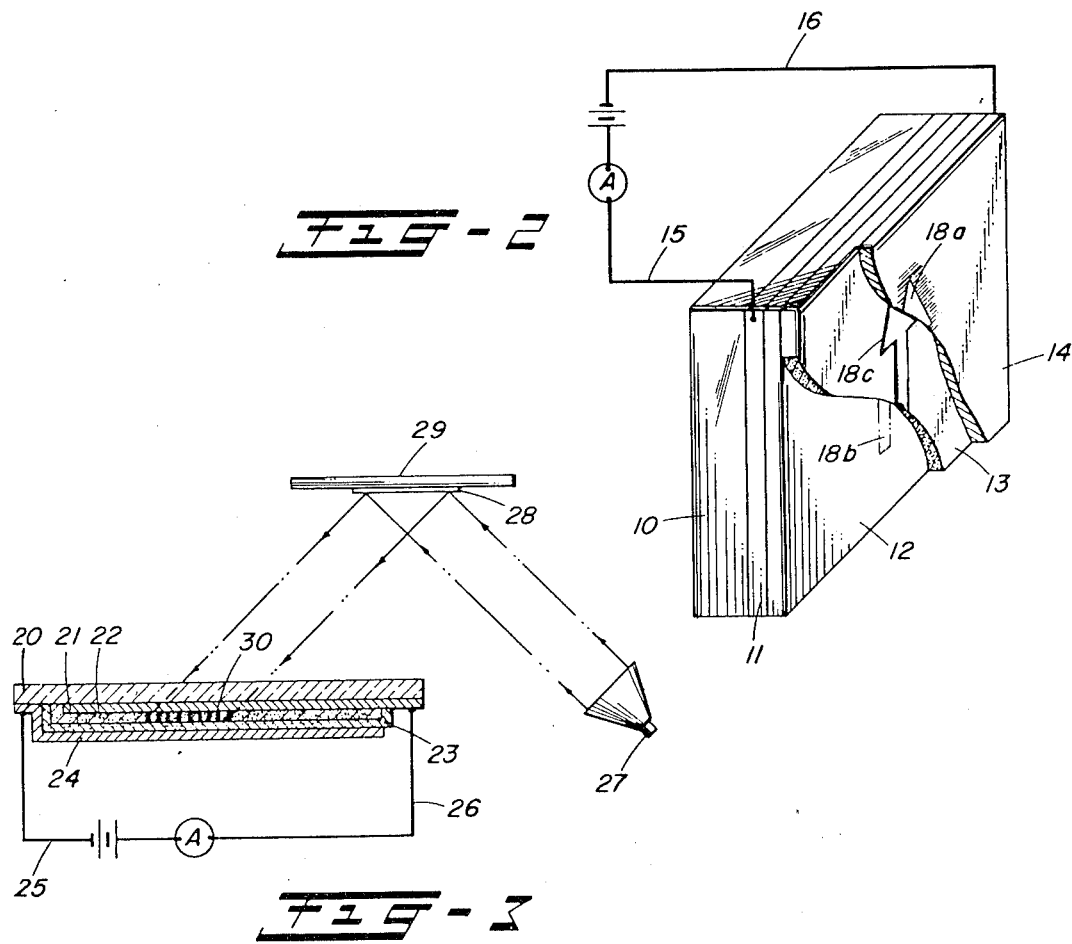
FIG-2
FIG-3

MULTILAYERED ELECTROPLATOGRAPHIC ELEMENT COMPRISING ION CONDUCTIVE AND ELECTROCHROMIC LAYERS

This is a continuation of my copending application Ser. No. 509,578, filed Sept. 26, 1974, now abandoned, which was copending with my application Ser. No. 315,966, filed Dec. 18, 1972, now abandoned, which was copending with my application Ser. No. 120,365, filed Mar. 2, 1971, now abandoned, which was copending with my application Ser. No. 616,790, filed Feb. 17, 1967, now abandoned, which was copending with my application Ser. No. 534,188, filed Mar. 14, 1966, now abandoned.

This invention relates to information reproduction processes and devices useful therefor. More particularly this invention relates to electrophotography and electro-optical or electrophotographic devices utilizing wholly solid state materials.

In addition to silver halide photography, the technology of information recording and reproduction has provided processes and devices such as those termed xerography, Electrofax, Thermofax, Ozalid, photo polymerization, and plastic deformation. These systems are based on solid state technology to a greater or lesser extent and therefore have an advantage in convenience over silver halide photography. However, with the possible exception of systems based on photopolymerization, the presently existing solid state reproduction processes are limited by low quantum yield and cannot compete with the speed and sensitivity of the silver halide process.

As described in an excellent review [J. J. Robillard, "New Approaches In Photography," Photographic Science and Engineering, 8, 18 (1964)], an ideal photographic process should be characterized by: (1) quantum yield competitive with silver halide systems; (2) solid state, i.e., dry processing; (3) minimum or no development time; (4) sensitization controllable by some external physical action such as an electric field, magnetic field, heat or radiation; (5) good resolution; and (6) good contrast.

It has now been discovered that by the process, element, and device of the present invention, the foregoing ideal is most nearly approached as will be evident in the description which follows.

The quantum yield of the silver halide process is extremely high since one photon induces an avalanche of chemical reductions. The present process provides high quantum yield by reason of a photon striking the photoconductor layer, inducing an avalanche of electrons which in turn induce new electromagnetic radiation absorption centers in the electrochromic layer of the invention. Moreover, as will become evident, no chemical transfer (liquid, solid, or electrolytic) is required in the single step of the process which combines sensitization (triggering or latent image formation) and development (amplification). Further, no fixing or cleaning stops are required and the element or device of the invention may be handled in daylight while not subjected to an electric field since it is insensitive thereto in this condition. Still further, resolution is possible on virtually a molecular scale thereby permitting vastly greater information density than is possible by present systems. Other advantages include virtually indefinite reuseability, convenient control of sensitization, and self-dodgeability.

The process, element, and device of the invention is therefore eminently useful in a wide variety of systems designed for various purposes such as high resolution photography, photocopying, master image reproduction, information storage, optical recording, radiography, and the like.

An object of the present invention is to provide a solid state electrophotographic process.

Another object of the invention is to provide a single step process for forming images which are essentially grainless and therefore capable of high resolution.

A further object of the invention is to provide a photographic process capable of high quantum yield, which process requires no chemical transfer, fixing, or cleaning.

A still further object is to provide electrophotographic elements and devices, capable of indefinite reuse, for solid state imaging and information reproduction.

These and other objects, features, and advantages of the invention are further detailed in the description which follows.

Accordingly, the present invention provides an electrophotographic process and element useful therein which element comprises in integral sandwiched or laminate arrangement the combination of (1) a layer which is photoconductive or which is made conductive by ionizing radiation [hereinafter called "layer (1)"], and (2) a layer of a persistent electrochromic material, said layers being in temporary or permanent electrical contact.

CONDUCTIVE LAYER

The material of layer (1), when a photoconductor, may be any of the numerous known materials, plates, films, and the like, which exhibit photoconductivity either positively (decreased resistance in the presence of the activating radiation) or negatively (increased resistance in the presence of the activating radiation). In addition, it is sometimes advantageous to employ known photoconductor materials which exhibit persistent conductivity changes, i.e., conductivity which persists after the removal of the exciting radiation. The latter materials include known photoconductive compounds such as the oxides, sulfides, and selenides of zinc and cadmium, dispersed in a resin binder. The phenomenon and further examples are described in R. M. Schaffert, *Electrophotography*, Focal Press, New York (1965), Chapter 4.

The more common and preferred photoconductors are the positive photoconductors, particularly those activated by visible light. Materials useful for production of the photoconductive layers may be inorganic or organic substances. As nonlimiting examples may be mentioned sulfur and selenium; the oxides, sulfides, selenides, tellurides, and halides of zinc, cadmium, mercury, antimony, bismuth and lead; titanium dioxide, barium titanate, and various photoconductors based on the foregoing such as zinc oxide modified by Lewis acids (U.S. Pat. No. 3,197,307). Organic substances include anthracene, anthraquinone, polynuclear aryl compounds in which the benzene rings are connected to each other by single carbon to carbon bonds, said compounds being substituted by at least one acyl radical (U.S. Pat. No. 3,215,528), various modifications of the foregoing, polymerizates and co-polymerizates such as described in U.S. Pat. No. 3,169,060, zinc oxide sensitized by certain dyes as in U.S. Pat. No. 3,203,795, and 8-hydroxyquinoline metal complexes as in U.S. Pat. No. 3,163,530. Other useful photoconductive materials are disclosed in U.S. Pat. Nos. 3,163,531, 3,163,532, 3,161,505, 3,158,475, 3,151,982, and 3,148,982.

Layer (1) may also comprise known materials which are made conductive, or in which conductivity is enhanced, by ionizing radiation such as X-rays, electron beams, gamma rays, beta rays, and the like. These materials render the element and device of the invention valuable in radiography.

The materials of layer (1) may be self-supporting but preferably are formed directly on the electrode. In some cases they may be employed with a backing material such as paper or a sheet or foil made from a film-forming plastic. The aforementioned patents disclose backing materials as well as binders and dispersing media.

ELECTROCHROMIC MATERIALS

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

The materials which form the electrochromic materials of the device in general are electrical insulators or semiconductors. Thus are excluded those metals, metal alloys, and other metal-containing compounds which are relatively good electrical conductors.

While not wholly understood, it appears that the materials contain in non-stoichiometric proportions at least two different elements, said elements being present as ions of opposite polarity. This condition produces lattice defects as distinguished from mere physical displacement of crystal symmetry, although the condition may also result in or be evidenced by such. Lattice vacancies are particular instances of lattice defects as, for example, an oxygen vacancy in a metal oxide crystal.

Two classes of electrochromic materials may be distinguished which satisfy the foregoing conditions and are therefore useful in the present invention. The first and preferred class (I) comprises materials disclosed in the above-mentioned prior patent applications. These materials exhibit persistent electrochromism over a wide temperature range including ambient temperature and in some instances high temperatures, e.g., above about 125° C., or low temperatures, e.g., below about −50° C. By "ambient temperature" is meant temperatures normally encountered in the fields of use of the devices such as described hereinafter, e.g., −50° C. to 125° C.

The second class (II), not included in application Ser. No. 530,086 and its continuation-in-part application, comprises materials which exhibit persistent electrochromism only at relatively high (non-ambient) temperature, e.g., above about 125° C. Examples of these materials are gross crystals or crystalline layers or films of alkali halides such as NaCl, RbCl, KCl, LiF, NaBr, KBr, KI, RbBr, and the like, as described in British Pat. No. 845,053 and corresponding West German Pat. No. 1,036,388. Combinations of class (I) and class (II) materials may also be employed.

The class (I) materials are further characterised as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements); materials containing non-alkali metal elements such as copper, tin and barium; and materials containing an alkali metal element with a variable oxidation state element. Preferred materials of this class are films of transition metal compounds in which the transition metal may exist in any oxidation state from $+2$ to $+8$. Examples of these are: transition metal oxides, transition metal sulfides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups IVB, VB and VID of the Periodic System, and Lanthanide series metal oxides and sulfides. Examples of such are copper stannate, tungsten oxide, molybdenum oxide, titanium oxide, vanadium oxide, niobium oxide, cerium oxide, cobalt tungstate, metal molybdates, metal titanates, metal niobates, and the like.

The class (I) electrochromic materials are distinguished from prior known organic or inorganic materials which exhibit coloration in an electric field as a result of the Franz-Keldysh effect or the effect Platt describes as "electrochromism." As to Platt, see J. Chem. Phys. 34, 862–3 (1961). In the latter cases, coloration results from the shifting of an existing absorption band or spectral line by the electric field, whereas in the present case, an absorption band is created where none existed, upon coloration, or removal upon bleaching.

An important advantage of devices of the invention containing a class (I) persistent electrochromic material is operability at ambient temperature. So far as is known, this is the first instance of electrochromic behavior at temperatures of practical application. The invention, therefore, permits numerous practical applications to which prior art electro-optical devices are not susceptible as will be evident from the ensuing description.

As already mentioned, the invention is not limited to devices in which the electrochromic layer (2) shows new absorptions in the visible spectrum. Thus, infra red, ultra violet absorptions, and other absorptions in the electromagnetic spectrum, are readily detectable by conventional sensing devices. It will therefore be evident that choice of electrochromic layer material will be dictated in part by the spectral range of new absorptions desired for practical application of the devices of the invention. If visible transmission or reflection is required, as in data display, advertising, and the like, compounds will be chosen which exhibit new absorptions in the visible in an electric field. Likewise, if only ultra violet transmission or reflection is desired, as for confidential information, compounds which demonstrate new absorptions in an electric field permitting such transmission or reflection will be employed.

The new absorptions in the electrochromic layer will be more or less persistent on removal of the electric field, the degree of permanence, at least for class (1) materials, depending on the proximity of the new energy level to the conduction band.

By reversing the original polarity of the field or by applying a new field, it is also possible to cancel, erase, or bleach detectable electromagnetic absorption which has previously been caused in the electrochromic layer by any of several methods, including additive coloration, electrolytic coloration, coloration caused by heat, ionizing radiation or an electric field, and, in general, by any means whereby color centers are induced in the layer.

The invention is illustrated by the accompanying drawings in which

FIG. 1 shows isometrically one embodiment of the invention,

FIG. 2 is a cut-away view of FIG. 1,

FIG. 3 is an isometric cross-sectional view of a further embodiment of the invention, illustrating other means for impinging an optical image.

Figure 4:
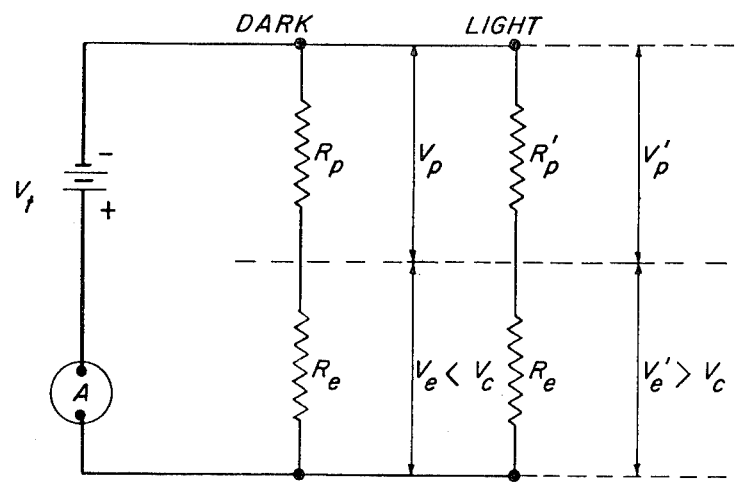
FIG. 4 shows an equivalent electrical circuit illustrative of the principle of the invention.

With reference to FIG. 1, 10 is a substrate or backing material which, relative to photoconducting layer 12 and persistent electrochromic layer 13, is electrically non-conducting. The substrate material may be rigid or pliable and may be glass, wood, paper, plastic, plaster, and the like, including transparent, translucent, opaque or other optical quality materials. A first electrode 11 overlays substrate 10. More generally, however, where said electrode 11 is self-supporting, backing or substrate layer 10 will be unnecessary. However, for some applications it is advantageous to provide an extremely fine metallic film of gold, silver, aluminum, indium, magnesium, and the like, or semi-conducting film as electrode 11 over a substrate layer 10. A particularly preferred example of a semi-conducting film over glass is "NESA" glass—glass coated with a conductive thin film of stannic oxide. A second electrode 14 forms the other external surface of the device. Said electrode may generally be of the same material as the first electrode but at least one of said electrodes must provide an optical transmittance effective for activation of the photoconductive layer, i.e., at least one electrode must be sufficiently transparent or translucent to permit photoconductively activating radiation to pass to the photoconductive layer.

Thickness of the electrodes, electrochromic layer, and layer (1) of the article or device of the invention is not critical. With respect to the electrochromic layer, however, preferred thickness is in the range of from about 0.1 to 100 microns. Moreover, since a small potential will provide an enormous field strength across very thin films, 0.1 to 10 microns electrochromic film thickness are particularly preferred over thicker ones. Optimum thickness will be determined by the nature of the particular materials employed, the geometry of the device, the desired intensity of absorption, and by the method of arranging or forming the layers since the particular materials and method may place physical (e.g., non-uniform film surface) and economic limitations on manufacture of the devices. In particular, the thickness of the electrochromic layer should be such as to provide appropriate matching of resistance of layer (1) and the electrochromic layer, i.e., such that the dark resistance of layer (1), when a photoconductor, is at least equal to, but preferably greater than, the resistance of the electrochromic layer.

Current density and voltage may be varied widely depending on the electrical characteristics of the device. For example, current densities of from about 1 microampere to 100 milliamperes per square centimeter and potentials of from about 1 to 100 volts will be effective. The electrical energy source and mode are not critical and electrical energy may be applied as direct current, alternating current, as pulsed direct current, or the like.

Again with reference to FIG. 1, 15 and 16 are leads connecting electrodes 11 and 14, respectively, to a convenient voltage source. For purposes of describing one mode of operation of the electrophotographic element and device of FIG. 1, 17 is an opaque cutout in which 18 is an aperture defining an information symbol (cutout image) to be recorded. While maintaining a voltage across the electrophotographic element comprising photoconductor layer 12 and electrochromic layer 13, said voltage being sufficient to induce new electromagnetic radiation absorption in the electrochromic layer, light of a wavelength effective to activate photoconductor layer 12 is impinged on cutout 17 to impose cutout image 18 as transmitted image 18a on the electromagnetic element.

FIG. 2 shows in cutaway view the effect on the various layers of the process just described. Thus, a latent image 18b, corresponding to cutout image 18, and defined by the conductivity variation, forms on photoconductor layer 12. As a consequence of this photo-induced conductivity variation, new electromagnetic radiation absorption is caused in electrochromic layer 13, which absorption corresponds in definition to latent image 18b whereby electrochromic image 18c is formed. When the new absorption is in the visible, electrochromic image 18c will appear to the eye as transmitted image 18a.

It will be understood that means other than cutout 17, such as transparencies, lens systems, and the like, may be employed to impart an optical image to the element described and that the nature of the electrochromic material may be varied so as to produce new absorption of a wavelength which can be detected by sensing means other than the human eye, such as optical detectors, and the like. It will also be understood that the optical image may be imposed by reflex as well as by transmission, from various angles and from either side of the device as desired (with use of support or backing materials, electrodes, and electrochromic layers of appropriate optical density, i.e., effective to permit passage of photoconductivity activating light).

FIG. 3 shows in cross section a second embodiment of the element and device of the invention, together with reflex means conventional in the art for imparting an optical image. With reference thereto, 20 is a support or backing material, 21 and 24 are electrodes, 22 is an electrochromic layer, 23 is a photoconductor layer, and 25 and 26 are leads, each substantially as described above with reference to FIGS. 1 and 2, with the difference that layers 12 and 13 are interposed. In the operation of the system, light source 27 causes the reflection of an optical image from copy material 28 on copy support 29 onto photoconductor layer 23 while a voltage required to induce new electromagnetic absorption in electrochromic layer 22 is maintained across the element. The reflected optical image induces conductivity variation on the photoconductor layer defining a latent image (not shown) on said layer corresponding to the optical image reflected from the copy material. The photo-induced current in turn causes the voltage to exceed the critical voltage for new absorption in the electrochromic layer, resulting in new absorption in the electrochromic layer corresponding in definition to the original optical image. The new absorption is shown as markings 30.

Various modifications of this mode of practice, with respect to electrochromic material, geometry of the device, angle and direction of impingement of optical image, optical density of the substrate and other layers, will at once be apparent to the routineer, given the inventive concept as above described. For instance, although the above-described FIGURES show closely packed or laminate structures, the invention is not limited thereto but includes structures which can be separated and reassembled.

Thus, the photoconductor layer or equivalent and the electrochromic layer may be employed as flexible or rigid films in contact or rolled up on separate spools as in a conventional plate camera or roll film camera, respectively. When the layers become superimposed and in electrical contact between suitable electrodes an optical image may be recorded in substantially the same manner as already described. Such conventional modes of operation employing fixed, separable, or flexible arrangements of the photoconductor layer or equivalent and electrochromic layer are described in U.S. Pat. No. 3,214,277 to Ploke with reference to distinctly different materials.

The principle of operation of the devices of the foregoing FIGURES may be described further by reference to FIG. 4 showing an equivalent circuit so arranged that with an applied total voltage ($V_t$) to the complete device structure, the voltage ($V_e$) applied to the electrochromic layer is less than the critical voltage ($V_o$) required for coloration when the system is not illuminated. By Ohm's law it can be seen that:

$$V_e = (V_t R_e)/(R_e + R_p)$$

where $R_e$ is the dark resistance of the electrochromic layer and $R_p$ is the dark resistance of the photoconductor. On exposure to light, the resistance of the photoconductor decreases to the value $R_p'$, whence it is obvious that the voltage applied to the electrochromic layer is increased as given by:

$$V_e' = (V_t R_e)/(R_e + R_p')$$

It follows that the voltage ($V_e'$) is now greater than the critical voltage ($V_c$) required for coloration and such coloration defining an optical image imposed on a contiguous photoconductor layer will result. Further, the excess of voltage over the critical level is controlled by the brightness of the illumination, since the resistance of the photoconductor is inversely proportional to the intensity of the light falling upon it; hence color intensity can be controlled by intensity of the illumination as well as by the field strength.

It is also possible by means of the invention to erase or enhance absorption which has been induced in the electrochromic field by means other than an electric field, for example, by heat, light, additive coloration, and the like. Thus, the molybdic oxide and tungstic oxide electrochromic films are also photochromic and may be colored by irradiation with ultra violet light. When optical images are formed in such films by means other than an electric field such optical images may be erased or enhanced by application of an electric field.

Figure 5:
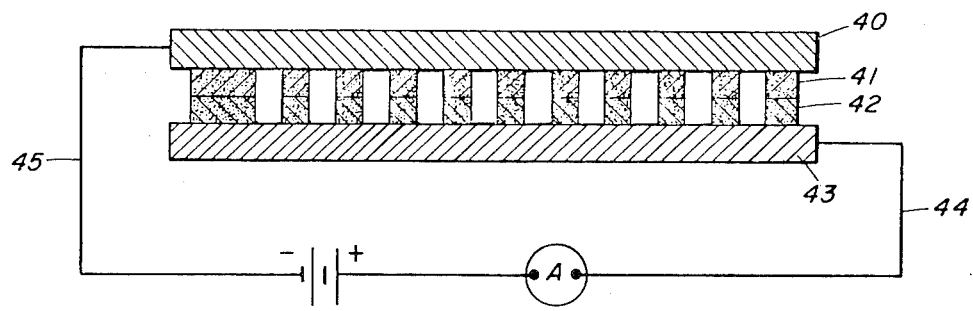
FIG. 5 is an isometric cross-sectional view of still another embodiment of the invention.

FIG. 5 illustrates in cross section means for reproducing virtually an unlimited number of direct image copies from a master, based on utilization of the altered resistivity or conductivity pattern which accompanies and is characteristic of the new absorption in the electrochromic layer of the element or device of the invention. With reference thereto, 40 is a first electrode, 41 is a first electrochromic layer, 42 is a second electrochromic layer, 43 is a second electrode, and 44 and 45 are leads to a voltage source. The electrodes and electrochromic layers are in electrical contact and the materials of such are substantially as already described. Markings 46 represent data or information defined by new absorption induced by an electric field (as in FIG. 3) or by other means whereby the lattice defects are filled or emptied, as by ultra violet light (photochromism) or heat (thermochromism), to establish a master copy. This first information-containing electrochromic layer 41 is then brought into electrical contact with the second electrochromic layer 42 and an electric field is applied across the two layers. A direct copy 47 of markings 46 forms on the second electrochromic layer. When the second electrochromic layer is so chosen as to absorb in the visible, the information markings of the copy will be visible. The copying process may be repeated indefinitely by utilizing new electrochromic layers, e.g., electrochromic copying paper. Master electrochromic layer 41 and copy layer 42 may be of the same material or may differ according to the permanence desired in the copy, sensing means for detecting the copy markings (when absorption in the second electrochromic layer is not in the visible), intensity of absorption, and the like.

The following example, illustrating a particular application of the present invention, is not to be construed as a limitation on the invention except as defined in the appended claims.

EXAMPLE

A thin film of cadmium sulfide, about one micron thick, is vacuum-deposited on a carefully cleaned conductive glass substrate (NE8A glass). Deposition is carried out at $10^{-5}$ Torr. pressure while maintaining the substrate at 150° C. The cadmium sulfide film thus deposited is quite conductive and its dark/photoconductive resistivity ratio is 2.5. The resulting coated substrate is then heated in air at 220° C. for 16 hours whereby the dark conductivity of the film decreases by several orders of magnitude and is comparable to the dark conductivity of the subsequently applied tungsten oxide film. At the same time the dark/photoconductive resistivity ratio increases from 2.5 to 200. A thin film of tungstic oxide, about one micron thick, is then vacuum-deposited on the cadmium sulfide film. The sandwich structure is completed by deposition of a gold film, about 0.02 microns thick, over the tungsten oxide film.

An optical image is then projected onto the photoconductive surface employing a 54 watt tungsten filament lamp. At the same time a direct current field of $5 \times 10^4$ volts per centimeter is maintained across the composite of cadmium sulfide photoconductor and tungsten oxide electrochromic layer. Current flow through the structure is 50 milliamperes. After exposure as described for several minutes, a dark royal blue image corresponding to the projected optical image forms on the electrochromic layer.

Substitution of molybdenum oxide or copper molybdate for the tungsten oxide film provides substantially the same result. However, when the electric field is removed from the structure containing a molybdenum oxide electrochromic film, the electrochromic image is substantially permanent as compared to the electrochromic image from the tungsten oxide film which slowly bleaches over several hours.

The device of the invention has the added advantage of providing a built-in mechanism for dodging. Thus, as absorption is intensified in the electrochromic layer, the intensity variation of the projected image on the photoconductor layer changes, resulting in alteration of the tonal scale of the electrochromic image. The effect may be compression or expansion of the tonal scale depending on whether coloration in the electrochromic layer is induced or erased.

I claim:

1. An electrophotographic element comprising, on a support, a photoconductive insulating layer on an ion conductive layer and, in conductive contact with said photoconductive layer, a persistent electrochromic layer of solid inorganic electrochromic substance responsive upon the application of a critical voltage across said layer in an electric field of one polarity by changing without chemical transfer, from a first absorption state to second absorption state and responsive upon the application of said critical voltage in a field of opposite polarity by changing without chemical transfer, from said second state to said first state, said substance being persistent in either of said states without chemical fixing after discontinuing the application of said critical voltage and being reversibly changeable at said critical voltage from either of said first and second states to the other, the reversible changes of absorption states in said electrochromic substance being the appearance and disappearance, respectively, of a radiation absorption band in the absorption spectrum of said substance, which band is created upon the change to one state and destroyed upon the change to the other state.

2. An electrophotographic element defined by claim 1 wherein said electrochromic substance consists of tungstic oxide.

3. An electrophotographic element defined by claim 2 wherein the defined layer is a film consisting of tungstic oxide of thickness in the range from 0.1 to 10 microns.

4. An electrophotographic element defined by claim 1 wherein said electrochromic substance consists of molybdenum oxide.

5. An electrophotographic element defined by claim 4 wherein the defined layer is a film consisting of molybdenum oxide of thickness in the range from 0.1 to 10 microns.

6. An electrophotographic element defined by claim 1 wherein said electrochromic substance consists of copper molybdenum oxide.

7. An electrophotographic element defined by claim 4 wherein the defined layer is a film consisting of copper molybdenum oxide of thickness in the range from 0.1 to 10 microns.

* * * * *